US010081970B2

United States Patent
Aselage et al.

(10) Patent No.: US 10,081,970 B2
(45) Date of Patent: Sep. 25, 2018

(54) ACTIVE GLOVE BOX DOOR WITH INTERLOCK BETWEEN LATCH RODS AND STRIKERS

(71) Applicant: FORD GLOBAL TECHNOLOGIES, LLC, Dearborn, MI (US)

(72) Inventors: Brandon M. Aselage, White Lake, MI (US); Stacey H. Raines, Ypsilanti, MI (US); Sean B. West, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 607 days.

(21) Appl. No.: 14/341,906

(22) Filed: Jul. 28, 2014

(65) Prior Publication Data

US 2016/0024821 A1 Jan. 28, 2016

(51) Int. Cl.
E05B 83/30 (2014.01)
E05C 1/08 (2006.01)
B60R 21/045 (2006.01)

(52) U.S. Cl.
CPC ............ E05B 83/30 (2013.01); B60R 21/045 (2013.01); E05C 1/08 (2013.01)

(58) Field of Classification Search
CPC ............. E05B 83/30; E05B 79/20; E05C 1/08
See application file for complete search history.

(56) References Cited

U.S. PATENT DOCUMENTS

| 4,743,060 | A |   | 5/1988 | Hishida |           |
|-----------|---|---|--------|---------|-----------|
| 4,781,407 | A | * | 11/1988 | Rauchhaus | B60R 7/06 |
|           |   |   |         |           | 292/169.11 |
| 6,669,243 | B2 | * | 12/2003 | Katoh | B60R 7/06 |
|           |   |   |         |         | 292/34 |
| 6,817,627 | B2 | * | 11/2004 | Galmiche | B60R 21/205 |
|           |   |   |         |         | 280/730.1 |
| 6,926,331 | B2 | * | 8/2005 | Cho | E05B 83/30 |
|           |   |   |         |     | 292/DIG. 41 |

(Continued)

FOREIGN PATENT DOCUMENTS

DE         10350683 A1 *  6/2005  ......... E05B 47/0696
DE     102009012710 A1 *  9/2010  ............. E05B 77/06

OTHER PUBLICATIONS

Machine Translation of DE 10350683 (Printed on Mar. 24, 2015).*
Machine Translation of DE 102009012710 (Printed on Mar. 23, 2015).*

Primary Examiner — Paul N Dickson
Assistant Examiner — Timothy Wilhelm
(74) Attorney, Agent, or Firm — Vichit Chea; MacMillan, Sobanski & Todd, LLC (57) ABSTRACT

An active glove box bolster system for an automotive vehicle comprises an instrument panel housing defining a door space. A glove box door comprises a longitudinally-movable latch rod having a sloped end. A striker is provided on the housing for receiving the latch rod in a pocket between a front wall and a rear wall. The front wall slidably engages the sloped end during closing of the door to retract the latch rod until it enters the pocket. The latch rod includes a first interlock element adjacent to the sloped end, and the rear wall includes a second interlock element aligned with the first interlock element. The interlock elements engage to resist movement in response to a force against the door in a direction to push the door through the door space.

9 Claims, 7 Drawing Sheets

(56) References Cited

U.S. PATENT DOCUMENTS

| | | | |
|---|---|---|---|
| 7,182,373 B2* | 2/2007 | Yamada | E05B 83/30 |
| | | | 292/141 |
| 7,261,318 B2 | 8/2007 | Enders | |
| 7,416,212 B2* | 8/2008 | Iwasaki | B60R 21/045 |
| | | | 280/751 |
| 8,403,374 B2* | 3/2013 | Shimizu | E05B 83/30 |
| | | | 292/137 |
| 8,449,001 B2 | 5/2013 | Whitens et al. | |
| 2006/0208506 A1 | 9/2006 | Kern et al. | |
| 2008/0306369 A1* | 12/2008 | Udupa | A61B 6/04 |
| | | | 600/407 |
| 2015/0008680 A1* | 1/2015 | Suzuki | B60R 7/06 |
| | | | 292/32 |

* cited by examiner

ACTIVE GLOVE BOX DOOR WITH INTERLOCK BETWEEN LATCH RODS AND STRIKERS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster in a glove box door.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner bladder wall may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

When incorporating an active bolster into the door for a glove box or other storage compartment, the inside back plate of the door is required to act as a reaction surface which must be relatively unmovable to that the inflating bladder and the front panel push outward, toward the vehicle occupant (instead of into the storage compartment). The door back plate typically spans the opening so that the edges of the door overlap with the instrument panel or compartment frame in order to stop the door movement at a closed position.

It is desirable to fabricate the back reaction wall from a moldable thermoplastic for low cost, low weight, and easy attachment to the bladder wall (e.g., by hot plate welding). One potential problem with such a reaction wall is that it may have sufficient flexibility to bend during deployment of the bolster. Bending may in some instances cause unlatching of the door which could then fall open, resulting in a loss of bolster functionality. Bending during the impact of a passenger against the front panel may instead result in the submarining of the reaction wall through the door opening. The submarining can result in a partial loss of restraint force being applied toward the impacting body.

The glove box door is typically maintained at a closed position as a result of retractable latch rods being extended into the pockets of respective strikers mounted on or formed integrally with a door frame or surround. The latch rods are spring loaded and have sloped ends so that the latch rods automatically retract as the sloped ends are pressed against the front walls of the strikers during the closing motion of the door. Because of 1) loss of contact due to deformation of the door during inflation and impact, and/or 2) latch retraction caused by sliding of the sloped ends of the latch rods against the rear walls of the strikers, conventional latch rods have not always been a significant factor in preventing submarining or falling open of the door during inflation/impact.

SUMMARY OF THE INVENTION

The present invention uses the latch rods to strengthen the glove box door against either submarining or falling open by introducing mechanical interlocking features in the latch rods and rear (car-forward) walls of the strikers. Placement of the interlock elements allows them to engage during a bolster deployment but not during normal door opening/closing operation.

In one aspect of the invention, an active glove box bolster system for a vehicle comprises an instrument panel housing defining a door space. A glove box door comprises a longitudinally-movable latch rod having a sloped end. A striker is provided on the housing for receiving the latch rod in a pocket between a front wall and a rear wall. The front wall slidably engages the sloped end during closing of the door to retract the latch rod until it enters the pocket. The latch rod includes a first interlock element adjacent to the sloped end, and the rear wall includes a second interlock element aligned with the first interlock element. The interlock elements engage to resist movement in response to a force against the door in a direction to push the door through the door space.

DETAILED DESCRIPTION OF PREFERRED EMBODIMENTS

Figure 1:
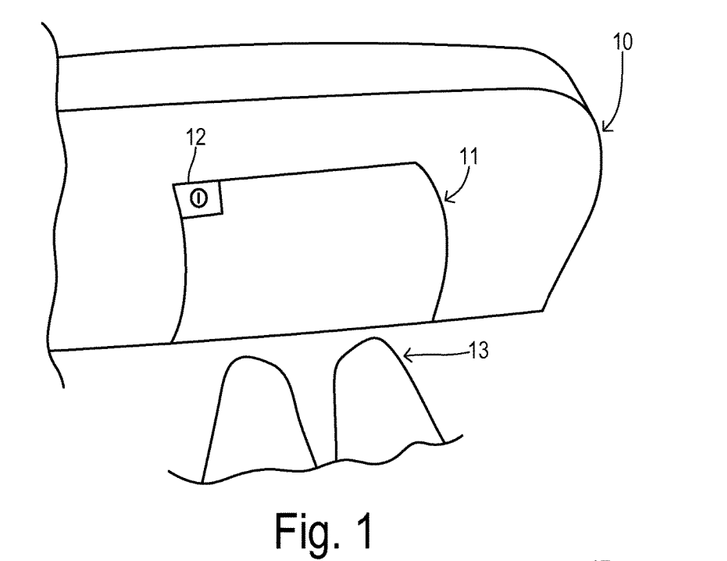
FIG. 1 depicts a glove box door system providing an active knee bolster to restrain a passenger during a vehicle crash.

Referring now to FIG. 1, an instrument panel system 10 of an automotive vehicle includes an active glove box system 11 which includes a push button latch mechanism 12 which may be activated to open glove box system 11 to access a storage bin (not shown). Active glove box system 11 inflates to receive a passenger's knees 13 during a crash event in order to mitigate forces applied to knees 13.

Figure 2:
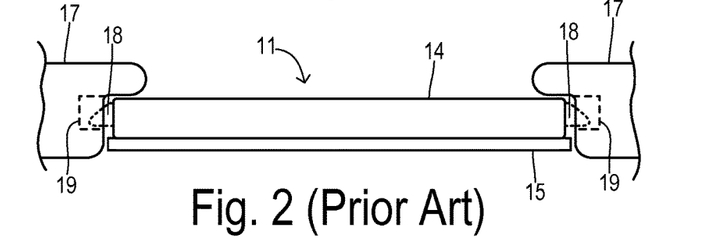
FIGS. 2 and 3 are top views of a prior art glove box knee bolster system before and during a crash.
Figure 3:
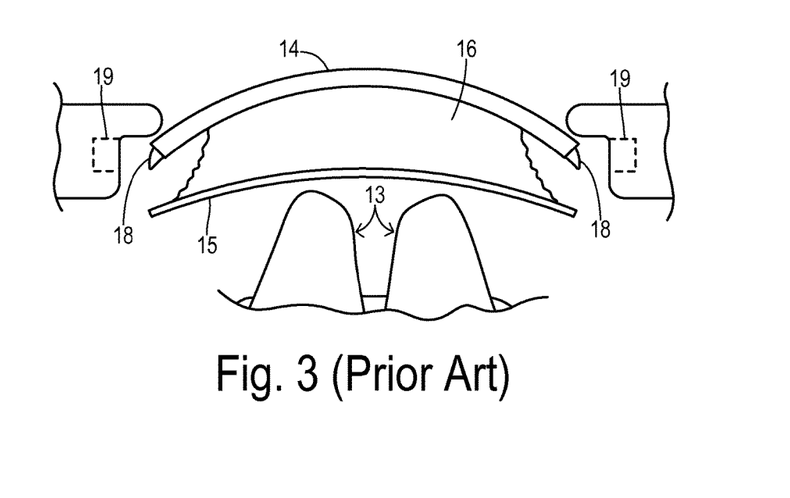

As shown in FIGS. 2 and 3, system 11 includes a back panel 14, a trim panel 15 and a bladder wall 16 for inflating during a crash event using gas supplied by an electronically-triggered inflator (not shown) when a crash event is detected. A door frame or surround 17 includes striker pockets 19 for receiving latch rods 18 which extend from each lateral side of door back panel 14. FIG. 3 shows an exaggerated deformation of back panel 14 during an impact of knees 13 on trim panel 15. The bending may result in the release of latch rods 18 from pockets 19 so that submarining could potentially occur.

Figure 4:
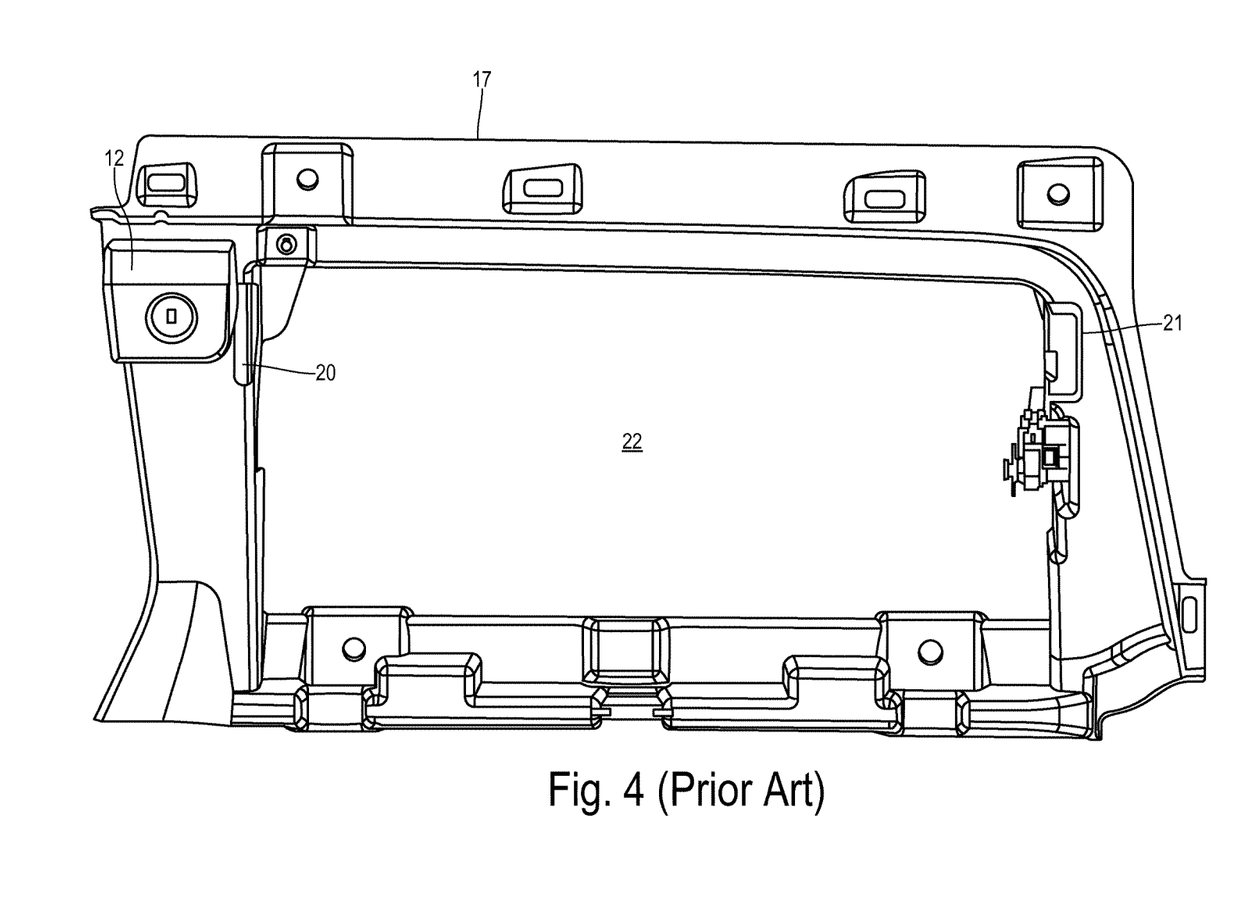
FIG. 4 is a front, plan view of a surround panel providing a door opening and for mounting the strikers that receive the door latch rods.

FIG. 4 shows an embodiment of surround 17 in greater detail. Push button latch operator 12 is mounted on the left side of surround 17 and incorporates a striker 20. A striker 21 is mounted at the right side of surround 17 on the opposite side of a door opening 22. Surround 17 is preferably molded thermoplastic. Strikers 20 and 21 are preferably comprised of metal, but could be partially or fully formed integrally with molded surround 17.

Figure 5:
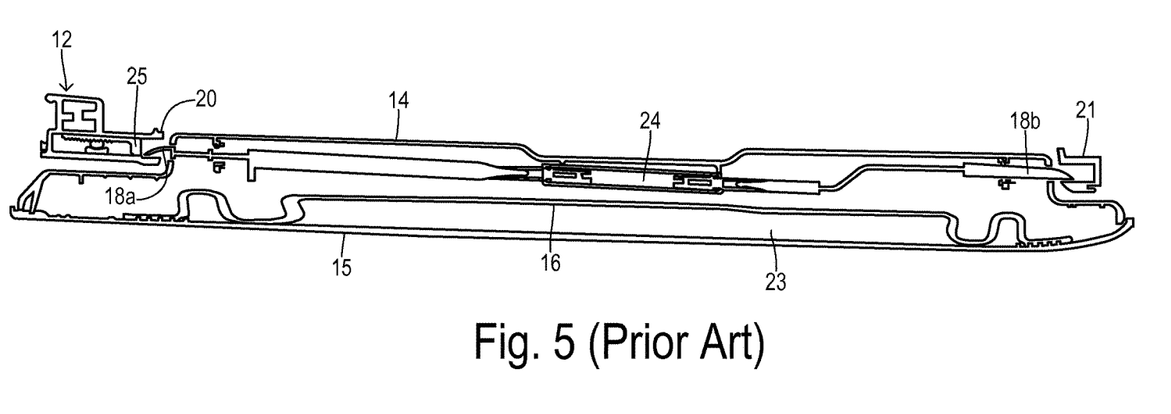
FIG. 5 is a horizontal cross-sectional view of an active glove box system showing a door back panel carrying the latch rods together with the strikers.

FIG. 5 is a top cross-sectional view of the glove box door showing back panel 14, trim panel 15, and bladder wall 16. Bladder wall 16 attaches to back panel 14 via welding towers (not shown) in its central region so that panel 14 acts as a reaction surface during inflation. Bladder wall 16 is hermetically sealed around its outer periphery with trim panel 15 to create a cavity 23 for receiving inflation gas from the inflator (not shown). Outward ends of latch rods 18a and 18b are captured by strikers 20 and 21, respectively. Inward ends of latch rods 18a and 18b are coupled to a gear mechanism 24 configured to provide a complementary reciprocating motion between latch rods 18a and 18b. Thus, in response to extension of a plunger 25 within push button mechanism 12 against latch rod 18a when a user pushes in on the push button to open the door, the retraction of latch rod 18a is transmitted to latch rod 18b so that it also retracts. Gear mechanism 24 includes a spring that urges latch rods 18a and 18b towards their extended positions, and the extension of plunger 25 overcomes the spring force. During closing of the door, sliding contact between the sloped ends of latch rods 18a and 18b and the front walls of strikers 20 and 21 causes latch rods 18a and 18b to retract, thus overcoming the spring force until the door closes by a sufficient amount to allow the latch rods to enter the pockets behind the front striker walls.

Figure 6:
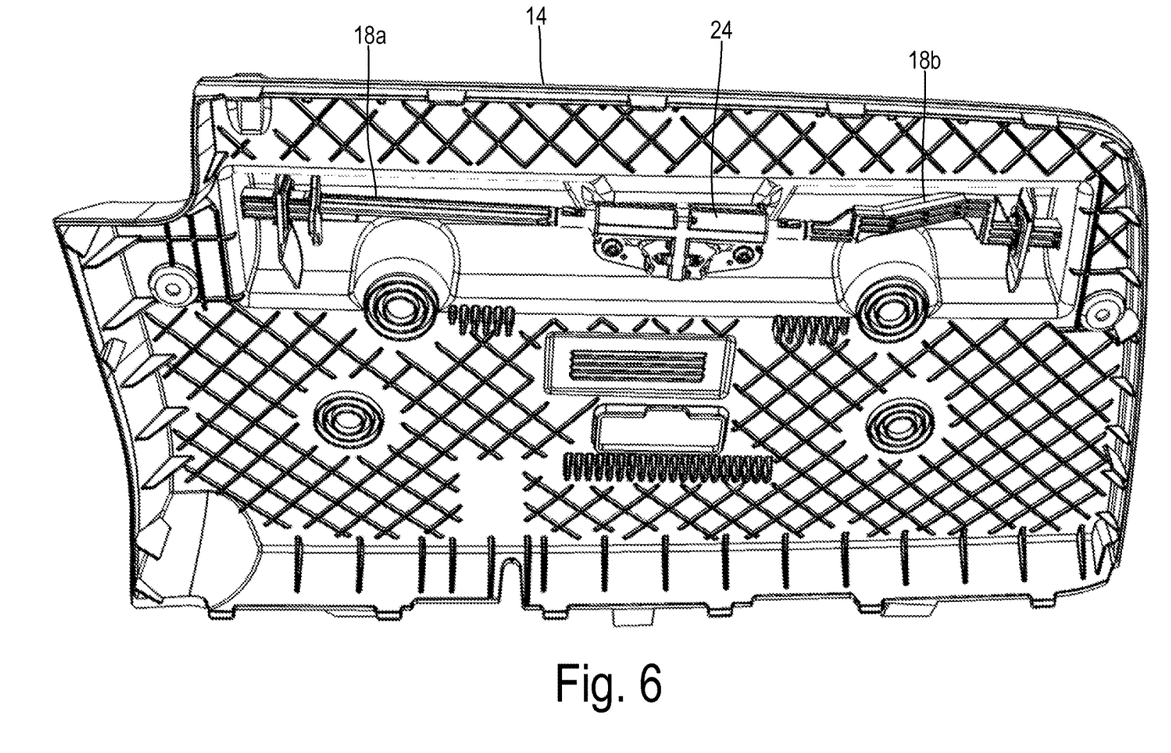
FIG. 6 is an internal, plan view of a door back panel with latch rods.
Figure 7:
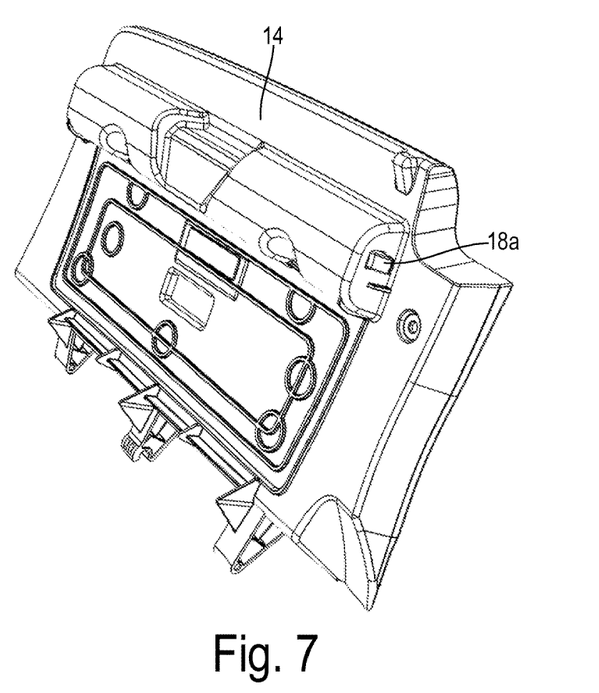
FIG. 7 is a rear perspective view of a glove box door.
Figure 8:
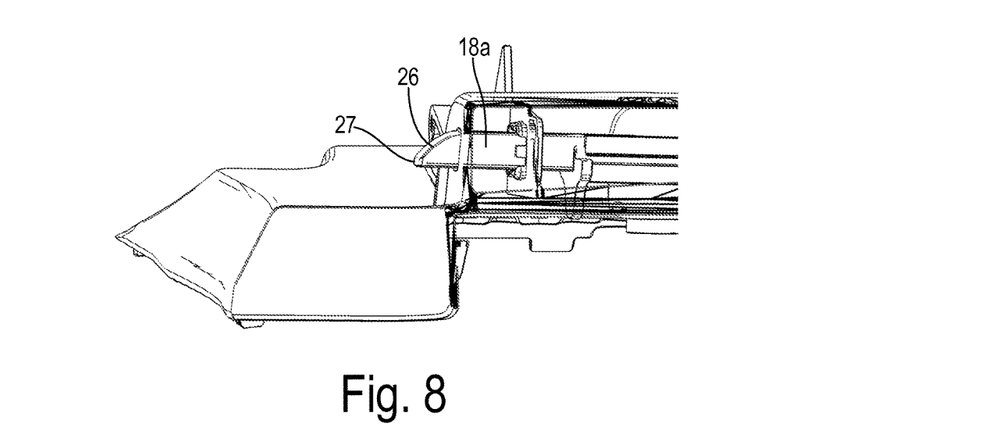
FIG. 8 is a partial cross-sectional view of a glove box door and latch rod.

FIG. 6 is a front plan view of back panel 14 of the door, showing gear mechanism 24 coupled to latch rods 18a and 18b. As shown in FIGS. 7 and 8, the sloped end of latch rod 18a extends from back panel 14 in order to engage the striker. Latch rod 18a has a nose 27 which is engaged by the pushbutton plunger during door opening to release latch rod 18a from the striker pocket.

Figure 9:
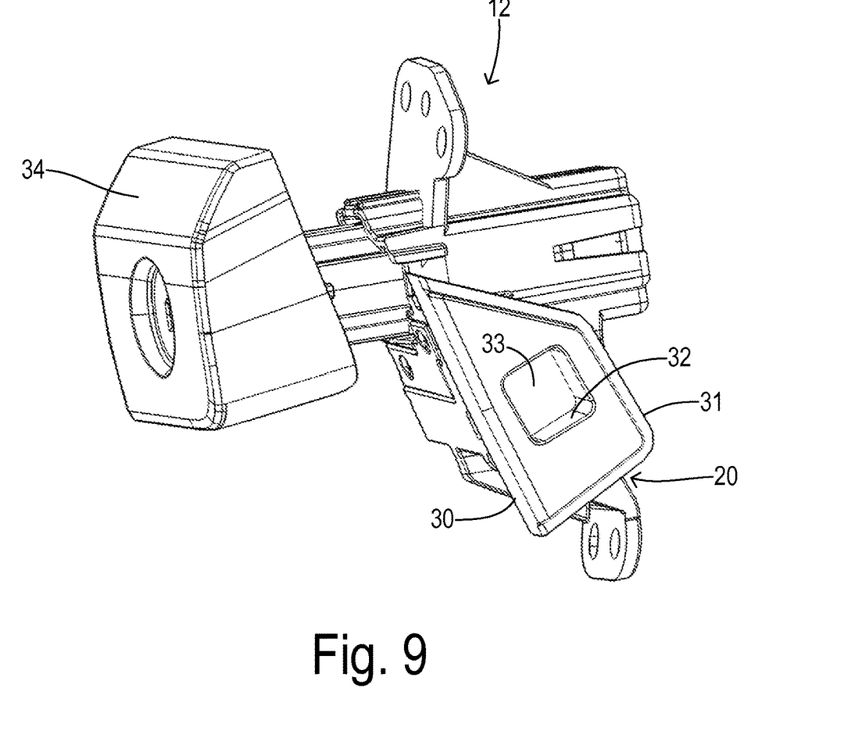
FIG. 9 is side perspective view of a striker with a lock and push button opener for retracting the latch rods to open the door.

Push button latch mechanism 12 is shown in greater detail in FIG. 9. Metal striker 20 has a front wall 30, a rear wall 31, and a latch pocket 32 that receives plunger 33. Mechanism 12 includes gearing which converts movement of a push button 34 into lateral movement of plunger 33.

In order to utilize the latch rods as a structure for maintaining door closure during an impact, interlock elements are added to the latch rod and the striker rear wall that engage during a crash event in response to door forces that might otherwise extend a portion of the door beyond the door opening space within the door frame or instrument panel. Care is taken to ensure that the interlock elements do not interfere with normal opening or closing of the door. The interlock elements can be added to either or both rod/striker pairs.

Figure 10:
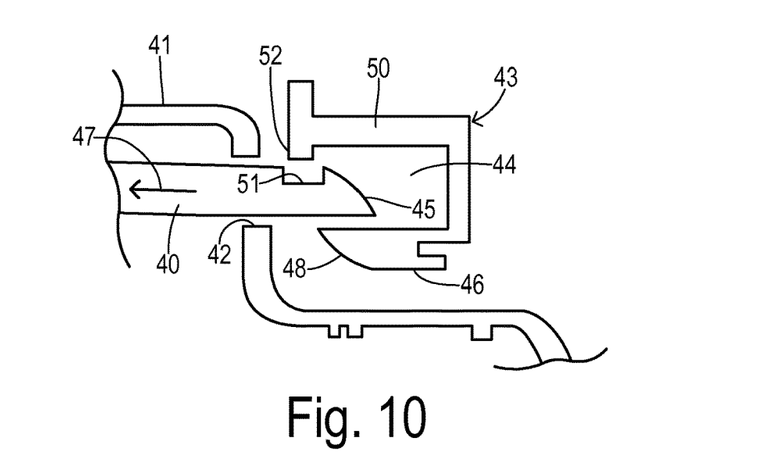
FIG. 10 is a vertical cross-sectional view of a latch rod and striker with interlock elements or features used by the present invention to reduce submarining of the door.

As shown in FIG. 10, a latch rod 40 extends from a back panel 41 of the door through an opening 42 into a pocket 44 of a striker 43. Latch rod 40 has a sloped end 45 configured to engage a front wall 46 of striker 43 during door closing so that latch rod 40 is retracted along a longitudinal direction 47. Front wall 46 may preferentially include a sloped face 48 to reduce the door closing force that is required to get rod 40 to retract.

Striker 43 has a rear wall 50 defining the back surface of pocket 44. A preferred embodiment for the interlock elements comprises a notch 51 in latch rod 40 aligned with a matching bar 52 extending from near wall 50 toward notch 51. Bar 52 is configured to be captured in latch 51 in the event that latch rod 40 is driven toward rear wall 50 as a result of forces during a crash event.

Figure 11:
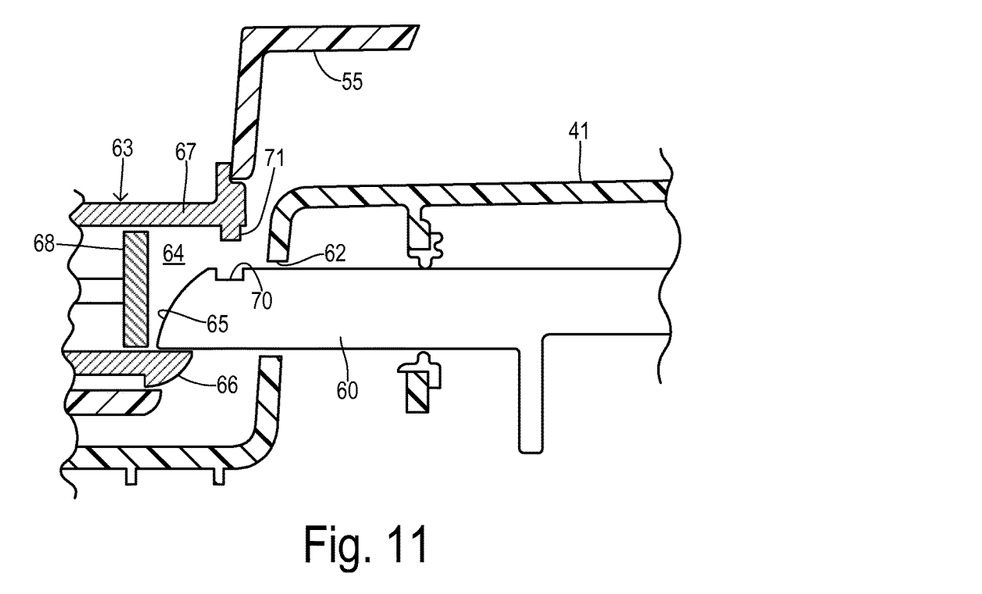
FIG. 11 is a vertical cross-sectional view of another embodiment of a latch rod and striker with interlock elements or features.
Figure 12:
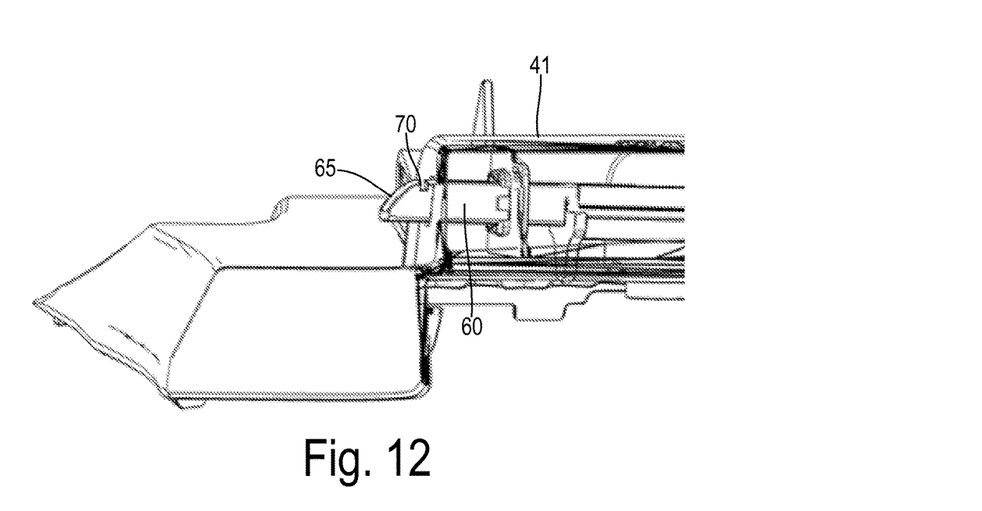
FIG. 12 is a partial cross-sectional view of a latch rod with an interlock notch of the present invention.

FIG. 11 shows the rod/striker pair on the opposite lateral side of the door wherein back panel 41 has an aperture 62 through which a latch rod 60 extends. A striker 63 is mounted on a surround 55 to provide a pocket 64 receiving sloped end 65 of latch rod 60. Striker 63 has a front wall 66 that slidably engages sloped end 65 during closing of the door in order to retract latch rod 60 in the known manner. Striker 63 has a rear wall 67 defining the back surface of pocket 64 and defining a sliding passage for a plunger 68 which under manual control via a push button for unlatching the door. The interlock elements include a notch 70 disposed adjacent to sloped end 65 which is aligned with a bar or extension 71 formed in rear wall 67. Bar 71 and notch 70 are configured to interlock in the event that latch rod 60 is driven toward rear wall 67 (i.e., in a forward direction of the car) as a result of forces during a crash event. Thus, the interlock elements engaged to resist movement in response to a force against the door in a direction to push the door through the door opening space within the instrument panel or a surround/frame. Notch 70 is disposed inwardly from sloped end 65 so that notch 70 does not interfere with the sliding interface between sloped end 65 and front wall 66 during closing of the door. As shown in the perspective, partial cross-sectional view of FIG. 12, even though the position of notch 70 places it inward of sloped end 65, it is still located outside of rear panel 41 so that it can engage the matching bar. Front wall 66 and rear wall 67 may be staggered as shown in FIG. 11 in order to prevent notch 70 from interacting with front wall 66 during door closing.

What is claimed is:

1. An active glove box bolster system for a vehicle, comprising:

an instrument panel housing defining a door space;

a glove box door comprising a longitudinally-movable latch rod having a sloped end; and a striker on the housing for receiving the latch rod in a pocket between a front wall and a rear wall, the front wall slidably engaging the sloped end during closing of the door to retract the latch rod until it enters the pocket;

wherein the latch rod includes a first interlock element adjacent to the sloped end, wherein the rear wall includes a second interlock element aligned with the first interlock element, and wherein the interlock elements engage to resist movement in response to a force against the door in a direction to push the door through the door space.

2. The system of claim 1 wherein the interlock elements are comprised of a matching bar and notch.

3. The system of claim 1 wherein the bar extends from the rear wall and the notch is formed in the latch rod.

4. The system of claim 1 wherein the striker and latch rod are disposed at a first side of the door, and wherein the system further comprises:

a second latch rod having a sloped end extending from a second side of the door and arranged for longitudinal movement in opposition to movement of the latch rod at the first side of the door; and a second striker on the housing at the second side of the door for receiving the second latch rod in a second pocket between a second front wall and a second rear wall, the second front wall slidably engaging the sloped end of the second latch rod during closing of the door to retract the second latch rod until it enters the second pocket;

wherein the second latch rod includes a third interlock element adjacent to the sloped end, wherein the second rear wall includes a fourth interlock element aligned with the third interlock element, and wherein the third and fourth interlock elements engage to resist movement in response to a force against the door in a direction to push the door through the door space.

5. The system of claim 1 wherein the door further comprises:

an inflatable bladder defining a cavity; and an inflator configured to supply inflation gas into the cavity during a crash event in order to expand an outer surface of the door toward a passenger of the vehicle.

6. An automotive storage compartment comprising:

a panel frame with a fixed striker disposed at a door opening; and a door including a back panel carrying a longitudinally-movable latch rod;

the latch rod and striker including sliding surfaces that retract the latch rod during door closing and interlock elements that engage in response to a submarining force during a crash event in a direction to push the rod against the striker.

7. The compartment of claim 6 wherein the interlock elements are comprised of a matching bar and notch.

8. The compartment of claim 7 wherein the bar extends from the striker and the notch is formed in the latch rod.

9. The compartment of claim 8 wherein the latch rod sliding surface is comprised of a sloped end, and wherein the notch is disposed adjacent to the sloped end.

\* \* \* \* \*